July 21, 1925.

J. A. HAWTHORNE, SR

VEHICLE

Filed Sept. 8, 1923

Inventor-
John A. Hawthorne, Sr.
by his Attorneys

July 21, 1925. 1,547,035
J. A. HAWTHORNE, SR
VEHICLE
Filed Sept. 8, 1923 4 Sheets-Sheet 3

Inventor:—
John A. Hawthorne, Sr.
by his Attorneys.

July 21, 1925.
J. A. HAWTHORNE, SR
VEHICLE
Filed Sept. 8, 1923　　4 Sheets-Sheet 4
1,547,035
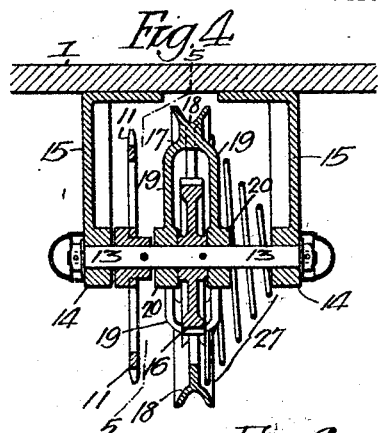
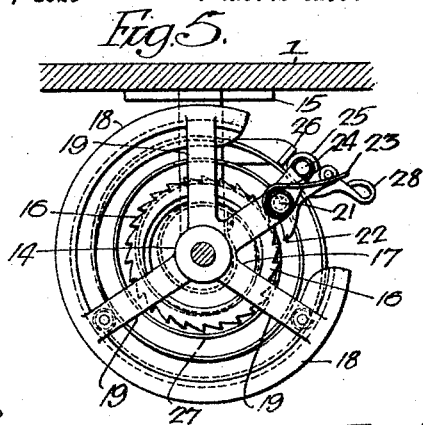
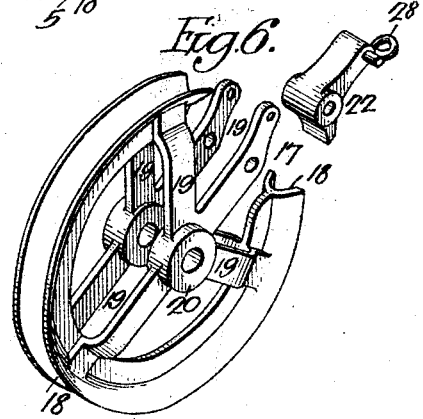
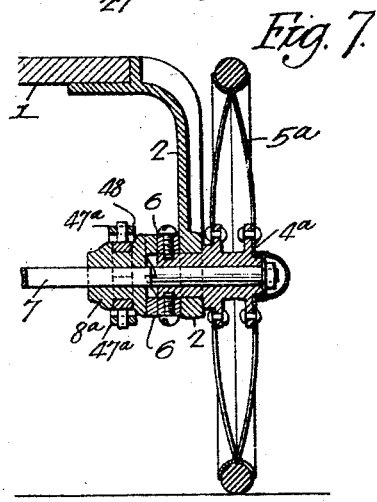
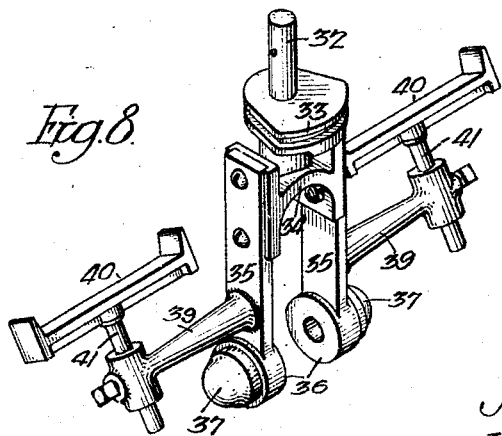
Inventor—
John A. Hawthorne, Sr
by his Attorneys Patented July 21, 1925.

1,547,035

UNITED STATES PATENT OFFICE.

JOHN A. HAWTHORNE, SR., OF PHILADELPHIA, PENNSYLVANIA.

VEHICLE.

Application filed September 8, 1923. Serial No. 661,659.

*To all whom it may concern:*

Be it known that I, JOHN A. HAWTHORNE, Sr., a citizen of the United States, residing in Philadelphia, Pennsylvania, have invented certain Improvements in Vehicles, of which the following is a specification.

My invention relates to certain improvements in vehicles that may be driven by hand or by power.

One object of the invention is to control the clutch mechanism on the driven shaft, or axle, from the steering means so that, when the steering means is actuated to cause the vehicle to turn towards the right or the left, the clutch mechanism will be actuated.

A further object of the invention is to construct the hand propelling mechanism of the vehicle as hereinafter described.

The invention also relates to further details, which will be fully described hereinafter.

In the accompanying drawings:

Fig. 4 is a sectional view on the line 4—4, Fig. 1;

Fig. 5 is a sectional view on the line 5—5, Fig. 4;

Fig. 6 is a detached perspective view of the grooved pawl carrier and pawl;

Fig. 7 is a sectional view on the line 7—7, Fig. 2;

Fig. 8 is a detached perspective view of the steering means; and

Figure 1:
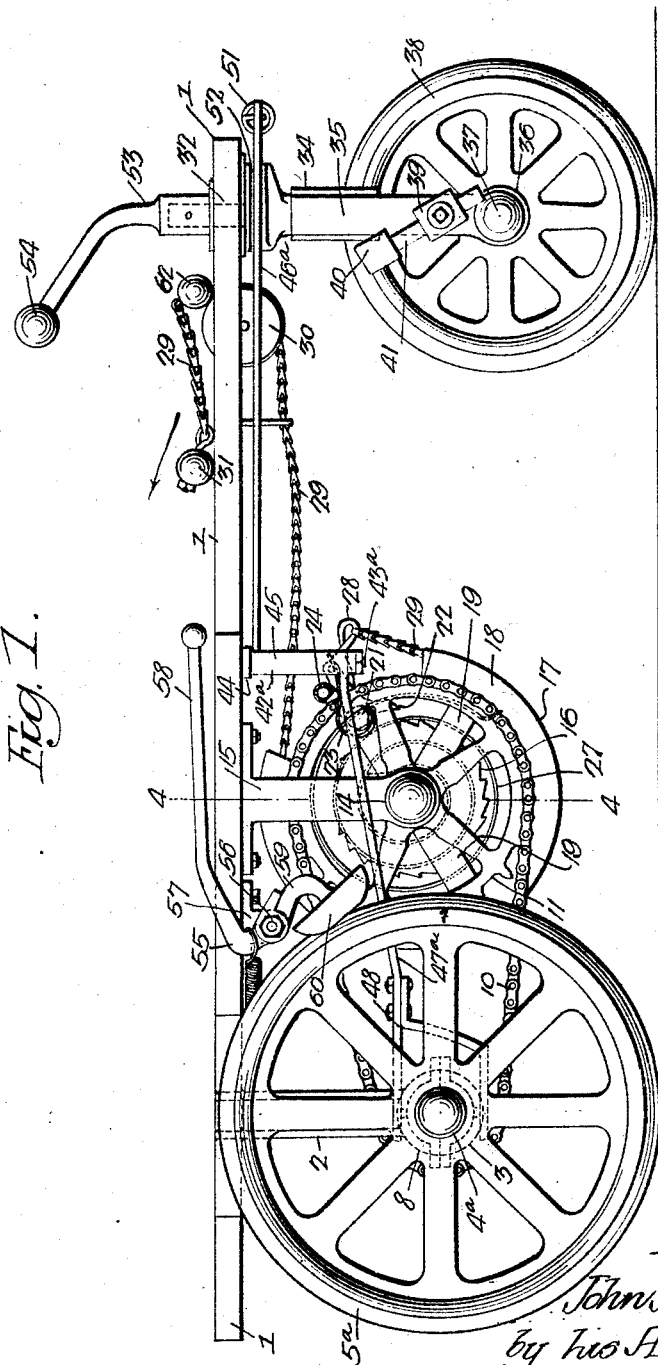
Fig. 1 is a side view of my improved vehicle.

Referring to the invention, 1 is the seat board. 2, 2 are brackets, one at each side of the seat board, near the rear. At the lower ends of these brackets are bearings 3. Independently journaled in the bearings are hubs 4, 4$^a$ of the wheels 5, 5$^a$. On the inner end of each hub is a clutch member 6.

A shaft 7 has its bearings in the hub members and is free to turn therein. In the present instance, the shaft is square. On the shaft are sliding clutch members 8, 8$^a$, which are arranged to engage the teeth on the clutch members 6 of the hubs 4, 4$^a$. These clutch members are controlled automatically by the steering means at the forward end of the vehicle. On the shaft 7 is secured a sprocket wheel 9, around which passes a chain 10 from the wheel 11. A front wheel 38 is journaled in the steering means.

When the front wheel is in the central position, both clutches are in engagement with their respective hubs and both wheels are driven to propel the vehicle. When the front wheel is turned to the right, the clutch is moved out of engagement with the hub so that the left wheel is the driver, the right wheel rotating loosely on the shaft. When the front wheel is turned to the left, the left clutch is moved out of engagement with its hub and the vehicle is driven by the right wheel.

The two brackets 2, 2 are connected together by a rod 12. As the brackets are firmly secured to the seat board, the rear structure of the vehicle is very substantial.

The sprocket wheel 11 is secured to a shaft 13, which forms part of a carrier, and is adapted to bearings 14 in brackets 15, which are attached to the underside of the seat board.

The hand propelling mechanism is an improvement on that described in the patent granted to me on the seventh day of March, 1922, No. 1,409,103. Secured to the shaft 13 is a ratchet wheel 16. Mounted loosely on the shaft is a pawl carrier 17, having a grooved rim 18, which extends about two-thirds around the pawl carrier. This pawl carrier has two sets of spokes 19 and two hubs 20, which are mounted on the shaft 13 on each side of the ratchet wheel 16, enclosing said wheel. Mounted on one of the spokes of the pawl carrier is a pin 21 on which is mounted a pawl 22, made as clearly shown in Fig. 6. This pawl is held out of engagement with the sprocket wheel by a spring 23. When out of engagement, the pawl rests against a bolt 24, which connects the opposite spokes. On this bolt is a washer 25 of rubber, leather, or other flexible material, which strikes against a stop arm 26 that is secured to one of the brackets 15. This stop arm limits the movement of the pawl carrier and the washer acts as a cushion to deaden the noise. In order to return the pawl carrier to its normal position, a spiral spring 27 is provided. The outer end of this spring is attached to the pawl carrier and the inner end is attached to one of the brackets 15.

Secured to an eye 28 on the pawl is a chain 29, which is located in the groove in the periphery of the pawl carrier and extends towards the front of the vehicle and passes around a grooved pulley 30 that is mounted on the seat board. The chain passes through the seat board and is attached to a hand hold 31. A ball 62 on the chain limits its movement. When the chain is pulled in the direction of the arrow, Fig. 1, by a rider located on the seat board, the pawl is moved into engagement with the ratchet wheel and rotary motion is imparted to the shaft 13, which, in turn, imparts motion to the shaft 7 through the drive chain 10. The rear wheels 5 are turned and the vehicle is propelled in the forward direction.

Figure 2:
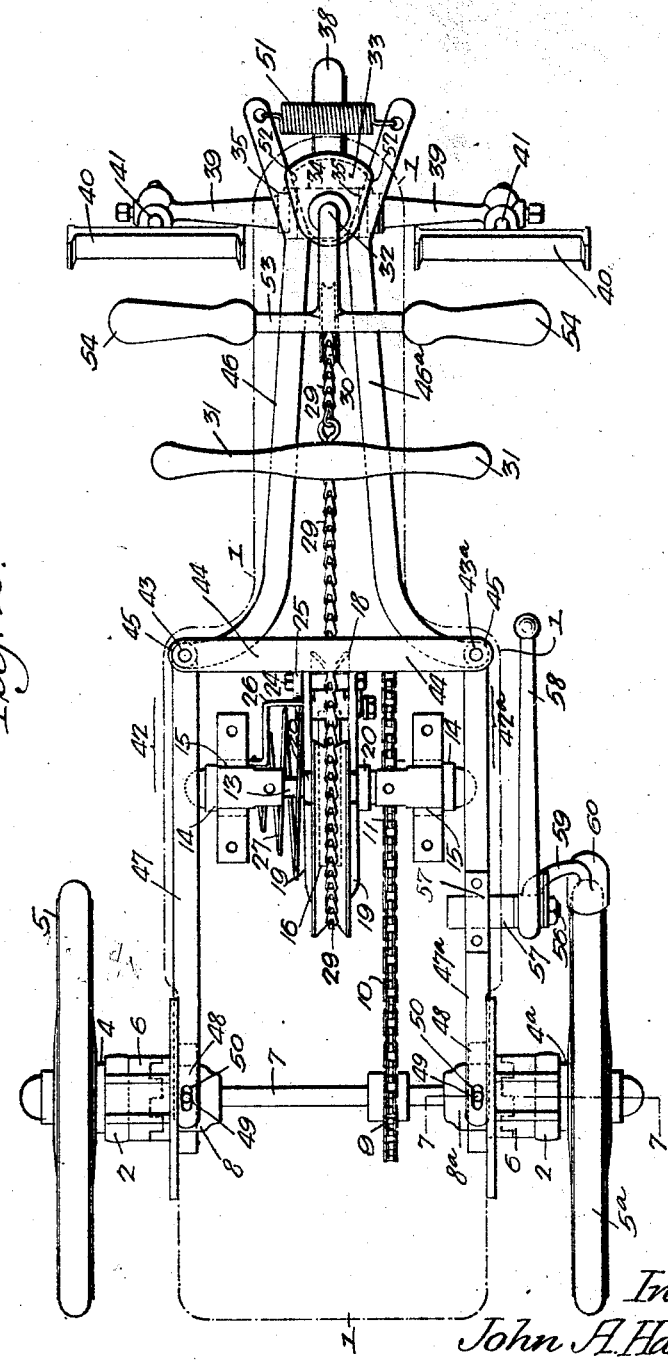
Fig. 2 is a plan view with the seat board removed.
Figure 3:
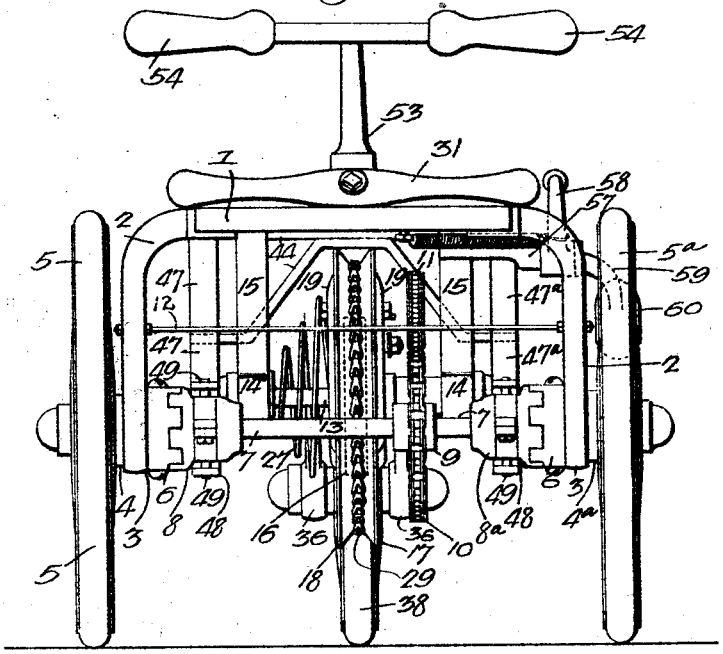
Fig. 3 is a rear view.
Figure 9:
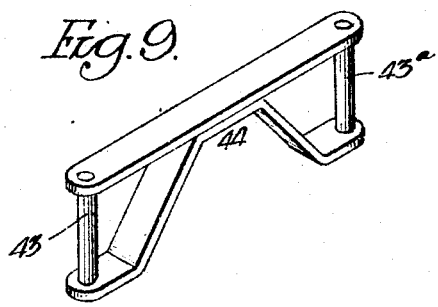
Fig. 9 is a perspective view of a detail of the invention.

Pivotally mounted at the front of the seat board is a vertical shaft 32, which forms part of a casting that has a cam section 33 and a cross head 34, as shown clearly in Fig. 8. Attached to the cross head are arms 35, having bearings 36 at the lower ends for the journal 37 on which the wheel 38 is mounted. Projecting laterally from the arms 35 are brackets 39, carrying foot rests 40. The spindle 41 on each foot rest is detachably mounted in the bracket and is held by a set screw, as shown. The cam 33 actuates mechanism for moving either one of the clutches out of engagement with its hub. This is accomplished by two levers 42 and 42$^a$. The hub 45 of the lever 42 is mounted on a pivot 43, carried by a frame 44, Fig. 9, which is secured to the under side of the seat board, as clearly shown in Figs. 1 and 2. One arm 46 of the lever 42 extends forward and rests against one side of the cam 33. The other arm 47 of the lever 42 is forked at 48 and spans the clutch member 8. Pins 49 on the clutch member extend into slots 50 in the forked portion of the lever. The lever 42$^a$ is similar to the lever 42 and has an arm 46$^a$, which extends on the opposite side of the cam 33. It also has a rearwardly extending arm 47$^a$, which engages the clutch member 8$^a$ in substantially the same manner as the arm 47. The lever 42$^a$ is pivotally mounted on the pin 43$^a$. The two arms 46 and 46$^a$ are connected by a spring 51 in front of the cam 33. This spring tends to force the arms 46, 46$^a$ in contact with the cam and yet will allow each lever to move on its pivot when the arm is forced laterally by the movement of the cam. The cam is grooved, as shown at 52, to receive the arms 46, 46$^a$ of the levers, holding them in proper position.

The shaft 32 extends through the seat board 1. Attached to the projecting portion of the shaft is a handle 53, which is provided with suitable handholds 54, which are grasped by the operator when he desires to turn to the right or to the left. The operator can turn the shaft, on which the front wheel is mounted, by means of the footrest, when it is desirable to continue the reciprocation of the ratchet mechanism.

A hand brake 55 is pivoted at 56 to a bracket 57, which is secured to the under side of the seat board. The arm 58 of the brake is in the form of a hand lever, and the arm 59 has a grooved shoe 60 that is arranged to bear against one of the wheels 5. In the present instance, the wheels have rubber tires, but it will be understood that they may be solid wheels in some cases.

The operation is as follows: The operator sits upon the vehicle with his feet resting on the foot rests at the front wheel. The handle 31, attached to the chain, is grasped by the hands and the handle is drawn towards the operator. The pawl 22 is moved into engagement with the ratchet wheel 16, which is turned. As the ratchet wheel is connected to the sprocket wheel 11, motion is imparted to the rear shaft. When both clutches are in mesh, both wheels are turned.

The vehicle is steered by the front wheel. When the front wheel is turned in one direction, one of the clutches is thrown out, which allows its particular wheel to turn freely on the shaft, while the vehicle is being propelled by the shaft. When the front wheel is turned in the opposite direction, the other clutch is thrown out in order to permit its wheel to turn freely, while the other wheel is turned by the operator.

The arms 46, 46$^a$ of the levers are drawn towards each other by the spring 51 and tend to hold the front wheel in a central position while the vehicle is moving in a straight path and also prevents wobbling of the wheel.

While the invention is described in connection with a hand operated vehicle, it will be understood that the clutch mechanism, and the means for actuating said mechanism from the steering means, may be used on a power driven vehicle with equal success and satisfaction, as the main feature of the invention is independent of the particular propulsion means for driving the rear axle.

I claim:

1. The combination in a vehicle, of two driving wheels; an axle; means for driving the axle; two clutch members, one arranged to engage one wheel and the other arranged to engage the other wheel; two longitudinal levers; a steering shaft; and a cam on the shaft, the levers bearing against the cam and being arranged to actuate the clutch mechanism when the steering shaft is turned.

2. The combination in a vehicle, of a rear axle; two wheels loosely mounted on the axle; a clutch for each wheel; a pivoted carrier for said front wheel, said carrier having a cam; and pivotally mounted levers having one arm engaging the cam and the other arm engaging a clutch so that, when the front wheel is turned, either one of the clutches will be thrown out of engagement with its wheel.

3. The combination in a vehicle, of a rear axle; two wheels loosely mounted on the axle; a clutch for each wheel; a driving shaft for driving the axle; a steering means; a wheel carried thereby; a cam on the steering means; and lever mechanism, actuated by the cam, for throwing either of the clutches out of engagement with its wheel.

4. The combination of a seat board; bearings thereon; wheels having hubs mounted in the bearings; a driving shaft extending into the hubs of the wheels; clutch members thereon; a steering wheel; a carrier therefor; a cam on said carrier; and levers, pivoted to a frame secured to the seat board, bearing against the cam at each side thereof and engaging the clutch members, so that, on turning a curve, one clutch will be disengaged.

5. The combination in a vehicle, of a rear axle; wheels thereon; clutch mechanism by which the wheels are actuated connected to the axle; means for driving the axle; steering means consisting of a frame having bearings; a wheel mounted in the bearings; foot supports; a cam; and lever mechanism through which the cam actuates the clutch mechanism.

6. The combination in a vehicle, of a seat board; brackets; wheels mounted in the brackets; an axle mounted in the wheels; clutch mechanism for connecting the wheels of the axle; means for driving the axle; steering means at the opposite end of the seat board from the axle; a wheel mounted on the steering means; a cam on said means; two pivoted levers, one engaging one clutch member and the other engaging the other clutch member, said levers having arms extending on each side of the cam; and a spring connected to the two levers and tending to hold them in contact with the cam.

7. The combination in a hand propelled vehicle, of a seat board; brackets at the rear of the vehicle; wheels having hubs mounted in the brackets; an axle extending into each wheel hub; a clutch member on each hub; sliding clutch members on the axle arranged to engage the clutch members on the hub; hand mechanism for driving said axle; steering means mounted in the forward end of the seat board, said steering means having a shaft; a handle on the shaft; a cross head; arms projecting from the cross head; a wheel having its bearings in the arms; lateral brackets carrying foot rests, said foot rests being adjustable on the brackets; a cam thereon; and lever mechanism, actuated by the cam, for operating the clutch mechanism when the steering means is turned to the right or to the left.

8. The combination in a vehicle, of steering means, including a carrier and a wheel; a cam on the carrier; an arm at each side of the cam; and means tending to force the arms in yielding contact with the cam to hold the wheel in position.

9. The combination in a vehicle, of a steering means including a carrier and a wheel; a cam on the carrier; a driving axle; wheels loose thereon; clutch mechanism for coupling the axle to the wheels; levers for operating the clutch mechanism, said levers having arms bearing against the cam at each side thereof; and a spring connecting the two arms and tending to hold the carrier and steering wheel in a central position, while the vehicle is being propelled in a straight path.

JOHN A. HAWTHORNE, Sr.